(12) United States Patent
Säger et al.

(10) Patent No.: US 6,418,775 B1
(45) Date of Patent: Jul. 16, 2002

(54) METHOD AND APPARATUS FOR ALIGNING A BEAM PATH FOR A BEAM-EMITTING SENSOR

(75) Inventors: Peter Säger, Friedrichsdorf; Thomas Landsiedel, Reichertshofen; Jörg Neugärtner, Regensburg, all of (DE)

(73) Assignee: Siemens (DE)

( * ) Notice: Subject to any disclaimer, the term of this patent is extended or adjusted under 35 U.S.C. 154(b) by 0 days.

(21) Appl. No.: 09/438,182

(22) Filed: Nov. 11, 1999

(30) Foreign Application Priority Data

Nov. 12, 1998 (DE) .......................... 198 52 101

(51) Int. Cl.⁷ .................................. G01S 7/40
(52) U.S. Cl. ...................................... 73/1.79
(58) Field of Search .................... 73/1.79, 1.81; 356/6, 9, 18; 33/1 P, 1 DD, 600, DIG. 21; 342/173, 174

(56) References Cited

U.S. PATENT DOCUMENTS 5,495,254 A 2/1996 Uemura et al.
5,742,383 A 4/1998 Jeon
6,020,844 A * 2/2000 Bai et al.

FOREIGN PATENT DOCUMENTS

| DE | 4201214 C | 1/1992 |
| DE | 19707591 | 2/1997 |
| EP | 0654680 | 5/1995 |
| EP | 0 905 526 A1 | 3/1999 |

* cited by examiner

Primary Examiner—Robert Raevis
(74) Attorney, Agent, or Firm—Mayer, Brown, Rowe & Maw

(57) ABSTRACT

A system and method for aligning the beam path of a beam-emitting sensor arranged on a motor vehicle. Convenient and nevertheless highly precise setting of the beam direction of the beam-emitting element is possible if, when the vehicle is stationary, an external aligning beam propagating along or parallel to an actual direction of travel of the motor vehicle 1 hits a strictly planar surface on the sensor which reflects the aligning beam, the incident aligning beam and the reflected aligning beam are made to overlap as a result of the position of the sensor being changed.

16 Claims, 5 Drawing Sheets

METHOD AND APPARATUS FOR ALIGNING A BEAM PATH FOR A BEAM-EMITTING SENSOR

BACKGROUND OF THE INVENTION

1. Field of the Invention

The present invention relates to a system and method for aligning the beam path of a beam-emitting sensor arranged on a motor vehicle.

2. Description of the Related Art

In distance regulating systems for motor vehicles, the motor vehicle has a radar or laser sensor which is used to detect one or more objects situated in the vehicle's direction of travel. In order to accomplish this result, the sensor outputs a signal which is reflected by the objects. The reflected beam is received by the sensor again and evaluated in an evaluation circuit. The evaluation circuit performs an analysis of the signals and determines the relative vehicle speed, the distance of the vehicle from the detected object, and the lateral course deviation of the vehicle traveling in front from the vehicle's direction of travel.

If the beam direction of the sensor is imprecise, objects are detected which are not of interest or important to consider. If the wrong vehicle is recognized as being the nearest to the vehicle, the distance regulator is set to this object, which can result in dangerous situations in road traffic and can possibly lead to a collision.

Particularly when determining the lateral deviation of the target from the vehicle's direction of travel, inaccuracies in the angular error may result in significant errors for the calculated lateral course deviation as the distance from the located target increases. Since the sensors used have detection ranges of up to 150 m, then, at this distance, an alignment error angle at the vehicle of one degree would result in an error of approximately 2.9 m. Because the width of the roadway is approximately 3.5 m on average, this means that it is very quickly possible for the target to be incorrectly assigned to the predetermined lane for the vehicle which is to be controlled.

SUMMARY OF THE INVENTION

The present invention is therefore based on the object of specifying a method and a device which can be used to set the beam direction of the beam-emitting element on the motor vehicle conveniently and yet very accurately.

The invention achieves the object in that, when the vehicle is stationary, an external aligning beam hits a strictly planar surface on the sensor which reflects the aligning beam, the incident aligning beam and the reflected aligning beam are made to overlap as a result of the position of the sensor being changed.

The advantage of the method is that the setting accuracy depends only on the accuracy of the positional determination in front of the vehicle, the light source and the projection plane with respect to one another and the position of the reflective surface with respect to the sensor detection range. The absolute position of the reference surface with respect to the projection plane and to the light source is negligible in this case. In addition, there is no need whatsoever to take into consideration the installation tolerances of the system on the vehicle. For example, the absolute position of the sensor with respect to the center of the vehicle or above the ground below or the road is irrelevant. Hence, the influence of undercarriage variants, for example lower sports undercarriages, or manufacturing tolerances in the region of a few centimeters between two vehicles is also eliminated.

The method according to the invention enables the sensor to be aligned reliably both in the horizontal (azimuth) and in the vertical (elevation).

To align the azimuth, the aligning beam propagates along or parallel to an actual direction of travel of the motor vehicle. Since the sensors used can only produce a detection range of a few angular degrees in the horizontal, it is particularly important to be able to set small angular changes reliably as well using the method according to the invention.

The action for aligning the vertical is similar. In this case, the aligning beam is oriented to a planar vehicle tire contact area. The vehicles are aligned when carrying no load at the end of the production line in the factory. Since vehicles are usually loaded when the distance regulator is operating, the position of the detection range with respect to the ideal line (the horizontal) is rotated in elevation. On top of this, vehicles pitch to a very considerable extent when driven, that is to say the vehicle executes a vertical movement about the vehicle's center of gravity. This happens, amongst other times, when starting off and accelerating or when braking. Furthermore, the detection range is also severely limited when the vehicle is climbing and descending.

In one refinement of the invention, before it hits the sensor, the aligning beam appears perpendicularly from a projection plane which the reflected beam hits and forms an image thereon. With the aid of such a projection plane, it is easy to ascertain a deviation between the emitted aligning beam and the reflected aligning beam.

The diameter of the aligning beam is advantageously approximately constant at least in the region between the projection plane and the sensor. In this case, the diameter of the light beam must be selected to be such that the smallest adjustment displacement is many times greater than the diameter of the light beam. This prevents errors in the alignment as a result of expansion of the light beam.

In one embodiment, the aligning beam is a laser beam which has a high constancy over a long path. The light beam can also be an infrared light beam. The vehicle's direction of travel advantageously corresponds to the actual driving axis of the motor vehicle. This actual driving axis is determined using vehicle axle measurement methods which are known per se. Hence, devices such as axle test benches already used today can be used to determine the vehicle driving axis. Additional aids for determining the actual direction of travel of a vehicle are not necessary.

The optical axis of the aligning beam is oriented to the vehicle's direction of travel either by orienting the vehicle or by orienting the aligning beam. In an apparatus for aligning a beam-emitting sensor arranged on the motor vehicle, a radiation source which emits an aligning beam is arranged behind a projection plane which lets through the aligning beam, and the aligning beam which passes through the projection plane hits a reflective surface mounted on the sensor in a repentable position with respect to the sensor. The reflected beam can be imaged on the projection plane via adjustment of a device which locks the sensor on the vehicle and coordinates the image of the reflected aligning beam with the emitted aligning beam in the projection plane.

In this case, the sensor can be arranged on the front, on the rear or else on the sides of the motor vehicle. In one embodiment, the projection plane has an opening through which the aligning beam passes, the center point of the opening coinciding with the optical axis of the light source. This ensures that it is not necessary to switch on the radar sensor or laser sensor for alignment. The precise setting of the beam direction of the sensor is ensured only using external aids.

In one simple embodiment, the projection plane is designed as a matt plate which can image the reflected beam. Hence, information is simply obtained about the direction in which the adjusting device must be moved in order to make the emitted aligning beam and the reflected aligning beam overlap.

A convenient embodiment of the invention is achieved in that the projection plane is designed as an active CCD linear array which is connected to the adjusting device via a control device. This makes electronic evaluation of the distance of the aligning beam from the reflected beam possible. Here too, the control device drives the adjusting device separately in terms of azimuth and elevation, until coordination is obtained.

In one refinement, the reflective surface is formed by an auxiliary device which is locked on the sensor by means of a three-point support. This three-point support gives the auxiliary device a defined position with respect to the reference surfaces and thus with respect to the detection range of the sensor. Each point of the support then correlates to a reference surface on the sensor.

In another refinement, the reflective surface is a reflective surface milled on the sensor housing itself. Auxiliary devices for providing the reflective surface can then be dispensed with. In one simple embodiment, the reflective surface is formed by a reflective plastic surface.

BRIEF DESCRIPTION OF THE DRAWINGS

The invention permits numerous embodiments. One of these will be explained in more detail with the aid of the figures illustrated in the drawing, in which.

The same features are identified by the same reference symbols.

DETAILED DESCRIPTION OF THE PREFERRED EMBODIMENTS

Figure 1:
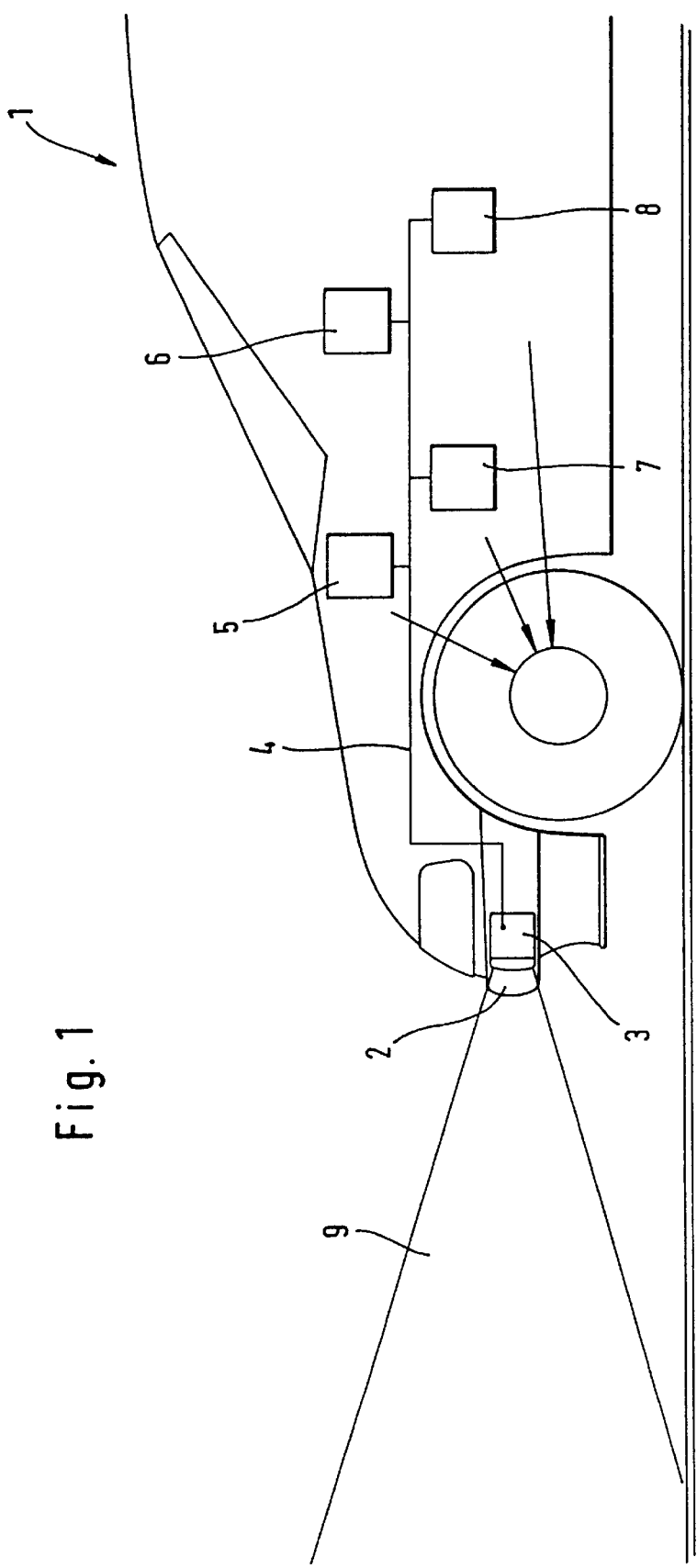
FIG. 1 illustrates an embodiment of the distance regulating device on a motor vehicle.

In FIG. 1, an automatic speed and distance regulating system 3 for maintaining the safety distance between vehicles is arranged on the bumper 2 of a motor vehicle 1. The speed and distance regulating system 3 includes a radar sensor and the distance regulating device, which are not shown further. A bus system 4 present in the vehicle 1 connects the automatic speed and distance regulating system 3 to the engine controller 5, the brake 7 or the transmission 8. By intervening in the engine controller 5, the brake 7 or the transmission 8, electronic commands automatically regulate the distance and the speed of the vehicle 1 to be regulated if it approaches a slower vehicle traveling in front. A display unit 6 which is likewise driven by the speed and distance regulating system 3 via the bus system 4, preferably a CAN bus, is used to display the current speed and also the distance from the vehicle traveling in front.

Figure 2:
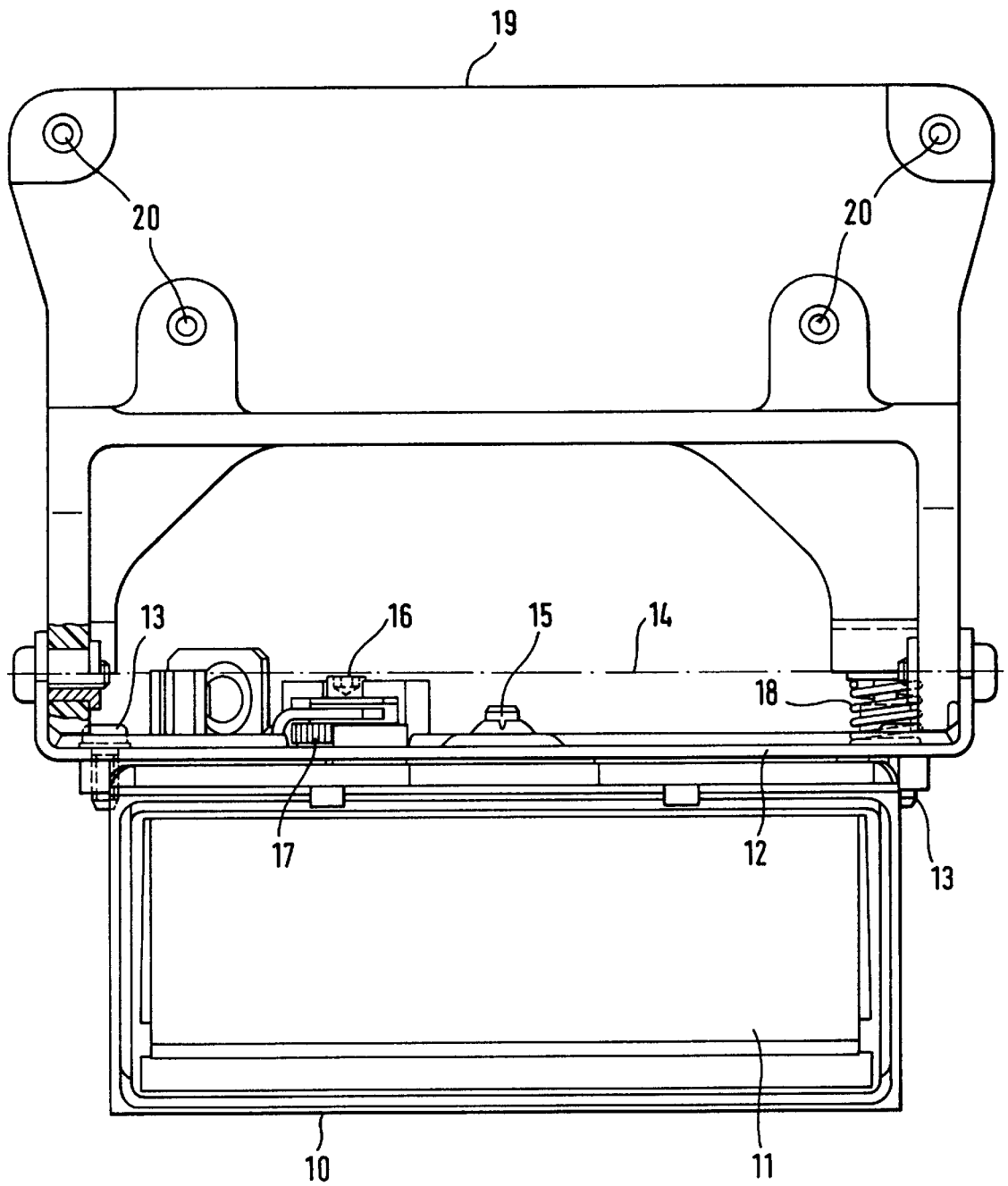
FIG. 2 illustrates an adjusting device.

FIG. 2 shows an adjusting device 19 which is mounted on the motor vehicle 1 using screw devices 20. Mounted on the adjusting device 19 is a housing 10 containing the radar sensor. The sensor is distinguished only by its lens 11, which rests on the housing 10 and is arranged perpendicular to the direction of travel.

The adjusting device 19 has a planar angle element 12 whose surface is connected to that surface of the housing 10 which faces the adjusting device 19. The angle element 12 stretches over the entire transverse extent of the sensor housing 10 and has, on each outer region, a respective screw connection 13, which is loosened for the aligning procedure.

To set the azimuth of the sensor beam, an adjusting screw 16 having latching devices 17 is turned, the housing 10 is pivoted about an axis which passes through the housing journal 15. The housing journal 15 is arranged at the center on the surface of the housing 10 and engages in the angle element 12. The distance between two latching devices corresponds to a particular angular change.

Figure 3:
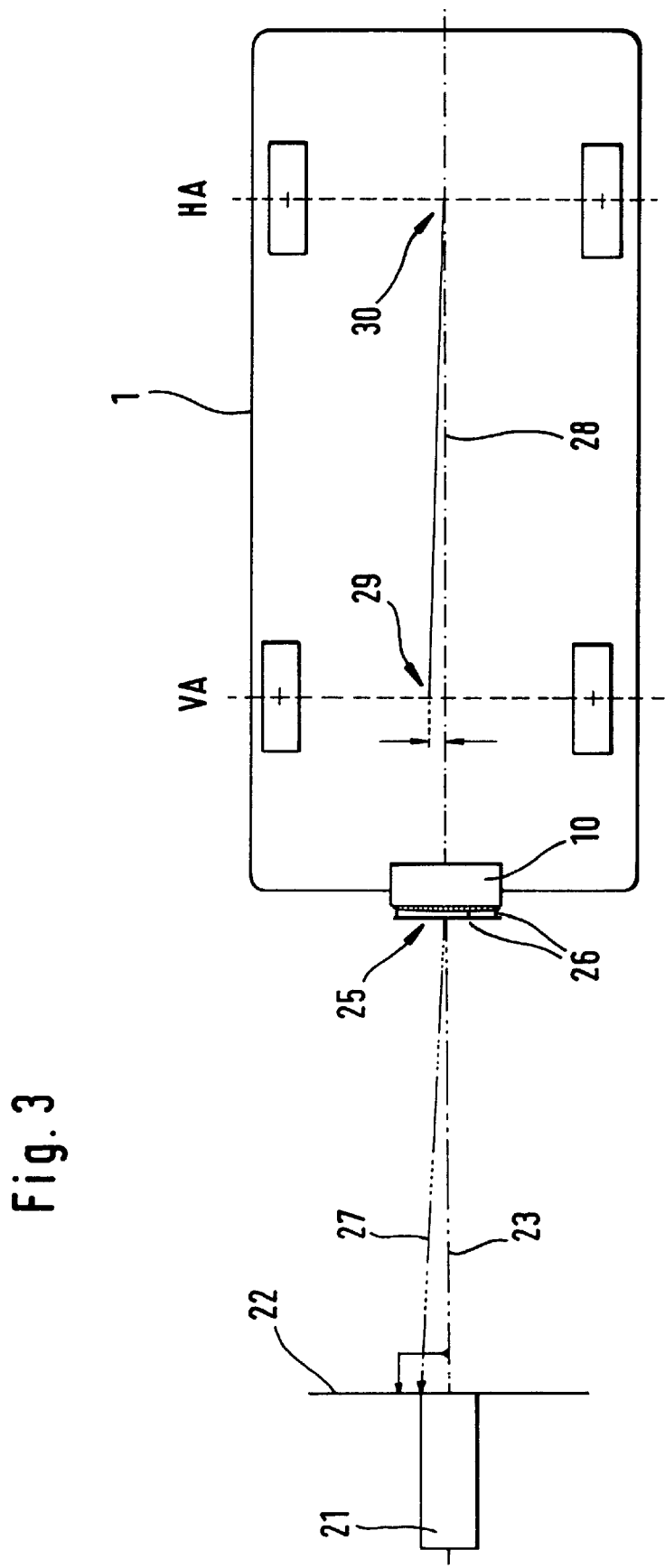
FIG. 3 illustrates alignment of the azimuth using the apparatus according to the invention.

The elevation of the sensor beam is set using a further adjusting screw 18, the sensor housing 10 being turned about an axis 14 of the adjusting device 19. FIG. 3 shows an aligning device. This aligning device comprises a light source 21, advantageously a laser, set up in front of the vehicle 1. In front of the laser, there is a projection plane 22 arranged at right angles to the optical axis of the laser 21. The laser beam 23 hits a mirror 25 mounted on the housing 10.

As shown in FIG. 3, the mirror 25 extends over the whole surface of the front of the sensor housing 10 and is locked on the housing 10 by means of three webs 26. This three-point support creates a reproducible and unambiguous position for the mirror 25 with respect to the sensor housing 10. This arrangement means that the mirror 25 follows every possible movement of the radar sensor, and there are no displacements between the mirror and the radar sensor.

The laser beam 27 reflected by the mirror 25 is imaged on the projection plane 22. To determine the vehicle's longitudinal axis 28, the center point 29 between the wheels on the front axle and then the center point 30 between the wheels on the rear axle are established. This difference between the two center points 29 and 30 established in this way corresponds to the deviation of the reflected laser beam 27 from the emitted laser beam 23. By adjusting the azimuth screw 16, the optical axis of the laser 22 is coordinated with the vehicle's longitudinal axis 28. The sensor device thus maintains a direction which enables the sensor beam 9 to be radiated in exactly the vehicle's longitudinal axis during driving.

Figure 4:
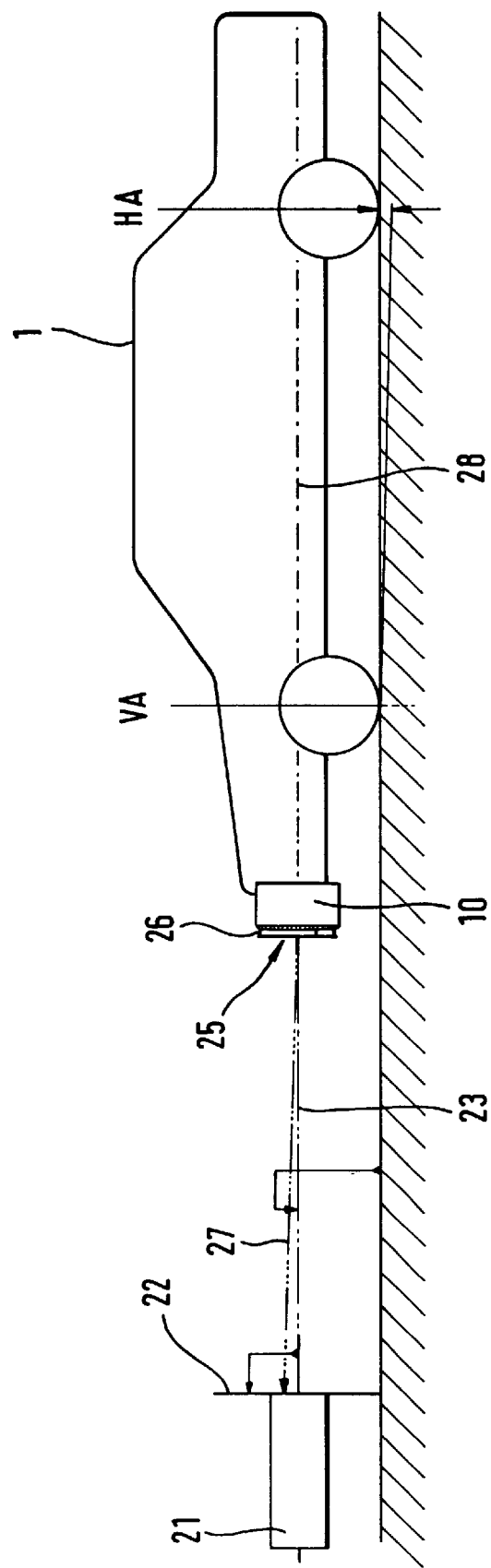
FIG. 4 illustrates alignment of the elevation using the apparatus according to the invention.

The process is similar for setting the elevation. The aligning device just described is used, and alignment is performed when the vehicle is empty and stationary, preferably at the place of manufacture. FIG. 4 shows that first the tire contact area for the front axle VA and then the tire contact area for the rear axle HA are measured. Here too, by adjusting the sensor housing 10 by actuating the adjusting screw 18, the sensor beam is set such that the reflected laser beam 27 and the emitted laser beam 23 are coordinated.

Figure 5:
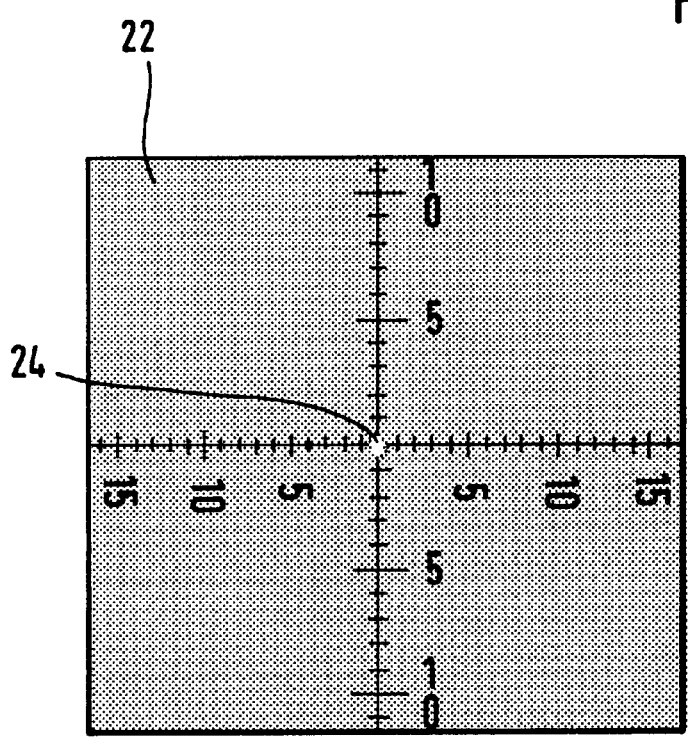
FIG. 5 is an illustration of the projection plane.

FIG. 5 shows the projection plane 22. For orientation purposes, the projection plane 22, designed as a matt glass plate in this case, has a scale shown on it for the driving axis angular errors. In this case, the azimuth is shown in the horizontal and the elevation is shown in the perpendicular. At the center point of this scale, the projection plane 22 has an opening 24 through which the external laser beam 23 passes. Since the reflected luminous radiation 27 is optically visible on the matt plate 22, simply actuating the adjusting screws 16 and 18 on the adjusting device 19 can direct the image of the reflected beam 27 onto the opening 24 in the center of the coordinate system.

Figure 6:
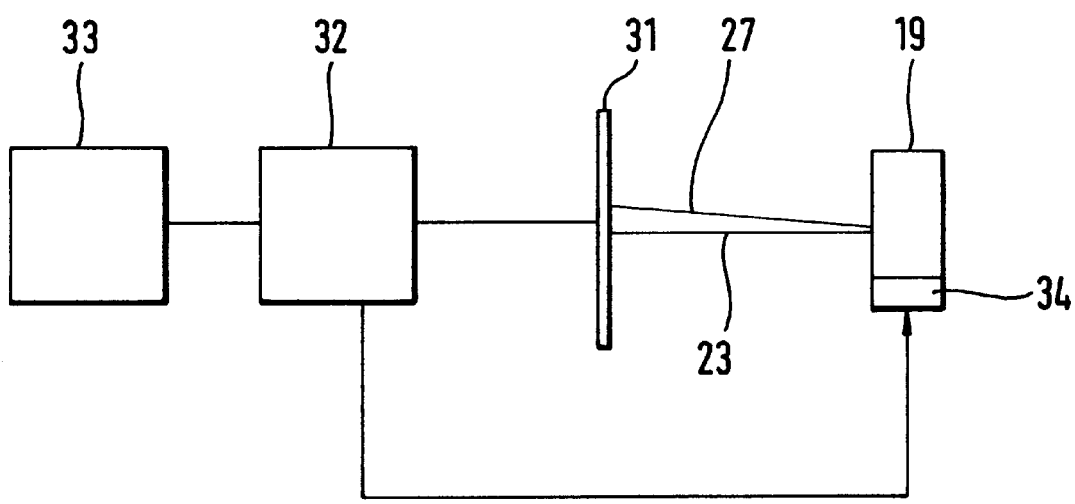
FIG. 6 illustrates automatic adjustment.

A convenient embodiment is shown in FIG. 6, where the projection plane is designed as a CCD linear array 31. In this arrangement, the electrical connections of the CCD linear array 31 are connected to a control device 32, which recognizes the distance between the emitted laser beam 23 and the reflected laser beam 27. A display device 33 is used to indicate to the worker by how many steps he needs to change the azimuth and the elevation, and in which direction, in order to obtain the desired result.

It is also conceivable, however, for the control device 32 to output these differences to the adjusting device 19 automatically via actuating elements 34, and for these actuating elements 34 to perform the latching steps automatically according to the measured difference.

We claim:

1. A method for aligning a beam path of a beam-emitting sensor on a vehicle comprising the steps of: directing an aligning beam on a surface of a sensor which reflects the aligning beam; and adjusting a position of the sensor to align the incident aligning beam and a reflected aligning beam so that they overlap.

2. The method as claimed in claim 1, wherein the aligning beam propagates at least substantially parallel to an actual direction of travel of the vehicle.

3. The method as claimed in claim 2, wherein the vehicle's direction of travel corresponds to the actual driving axis of the vehicle.

4. The method as claimed in claim 3, further comprising the step of orienting the aligning beam to the vehicle's direction of travel.

5. The method as claimed in claim 1, further comprising a step of orienting the aligning beam to a planar vehicle tire contact area.

6. The method as claimed in claim 1, further comprising a step of directing the reflected aligning beam onto a projection plane.

7. The method as claimed in claim 1, wherein the diameter of the aligning beam is approximately constant, at least in a region between the projection plane and the sensor.

8. The method as claimed in claim 7, wherein the aligning beam is a laser beam or an infrared beam.

9. An apparatus for aligning a beam-emitting sensor on a vehicle comprising:
    a radiation source behind a projection plane which allows the aligning beam to move towards a reflective surface mounted on the sensor located on the vehicle and
    an adjustment mechanism which locks the sensor on the vehicle making it possible to coordinate the image of the reflected aligning beam with the emitted aligning beam in the projection plane.

10. The apparatus as claimed in claim 9, wherein the projection plane has an opening through which the aligning beam passes.

11. The apparatus as claimed in claim 9, wherein the projection plane is a matt plate.

12. The apparatus as claimed in claim 9, wherein the projection plane is a CCD linear array which is connected to the adjusting device via a control device, the control device driving the adjusting device until the reflected beam is coordinated with the emitted beam.

13. The apparatus as claimed in claim 9, wherein the reflective surface is formed by an auxiliary device which can be locked on the sensor by means of a three-point support.

14. The apparatus as claimed in claim 9, wherein the reflective surface is on the sensor housing.

15. The apparatus as claimed in claim 13, wherein the reflective surface is a reflective plastic surface.

16. The apparatus as claimed in claim 9, wherein the optical axis of the light source coincides with the actual driving axis of the vehicle.

* * * * *